United States Patent [19]
Dowling

[11] 3,758,848
[45] Sept. 11, 1973

[54] MAGNETIC SUSCEPTIBILITY WELL LOGGING SYSTEM AND METHOD WITH AUTOMATIC NULL CONTROL

[75] Inventor: Donald J. Dowling, Houston, Tex.
[73] Assignee: Texaco Inc., New York, N.Y.
[22] Filed: Dec. 27, 1971
[21] Appl. No.: 212,276

[52] U.S. Cl. .................................................. 324/6
[51] Int. Cl. ........................ G01v 3/10, G01v 3/18
[58] Field of Search .................................... 324/3–7, 324/1

[56] References Cited
UNITED STATES PATENTS

| | | | |
|---|---|---|---|
| 3,614,600 | 10/1971 | Ronka | 325/6 X |
| 3,555,409 | 1/1971 | Atwood et al. | 324/6 |
| 3,065,407 | 11/1962 | Huddleston et al. | 324/6 |
| 3,105,190 | 9/1963 | Norris | 324/6 |
| 3,112,443 | 11/1963 | Buckner | 324/6 |
| 3,119,061 | 1/1964 | Tanguy | 324/6 |
| 3,496,455 | 2/1970 | Gouilloud | 324/6 |
| 3,609,522 | 9/1971 | Hutchins | 324/6 |

Primary Examiner—Gerard R. Strecker
Attorney—Thomas H. Whaley and Carl G. Ries

[57] ABSTRACT

An automatic null control circuit and method is employed in a magnetic susceptibility well loging system for regulating the null voltage employed to cancel the exciter voltage component of the receiver coil signal. Means and method are provided for determining the amplitude difference between the null voltage and the exciter voltage component, whereby the null voltage is multiplied by a factor which is functionally related to the difference. Since the null and receiver coil signals are both AC, the amplitude difference is also a phase-dependent function. Accordingly, it is an adjunct of the automatic null control system and method to also monitor and correct for phase difference between the null and receiver voltages.

20 Claims, 3 Drawing Figures

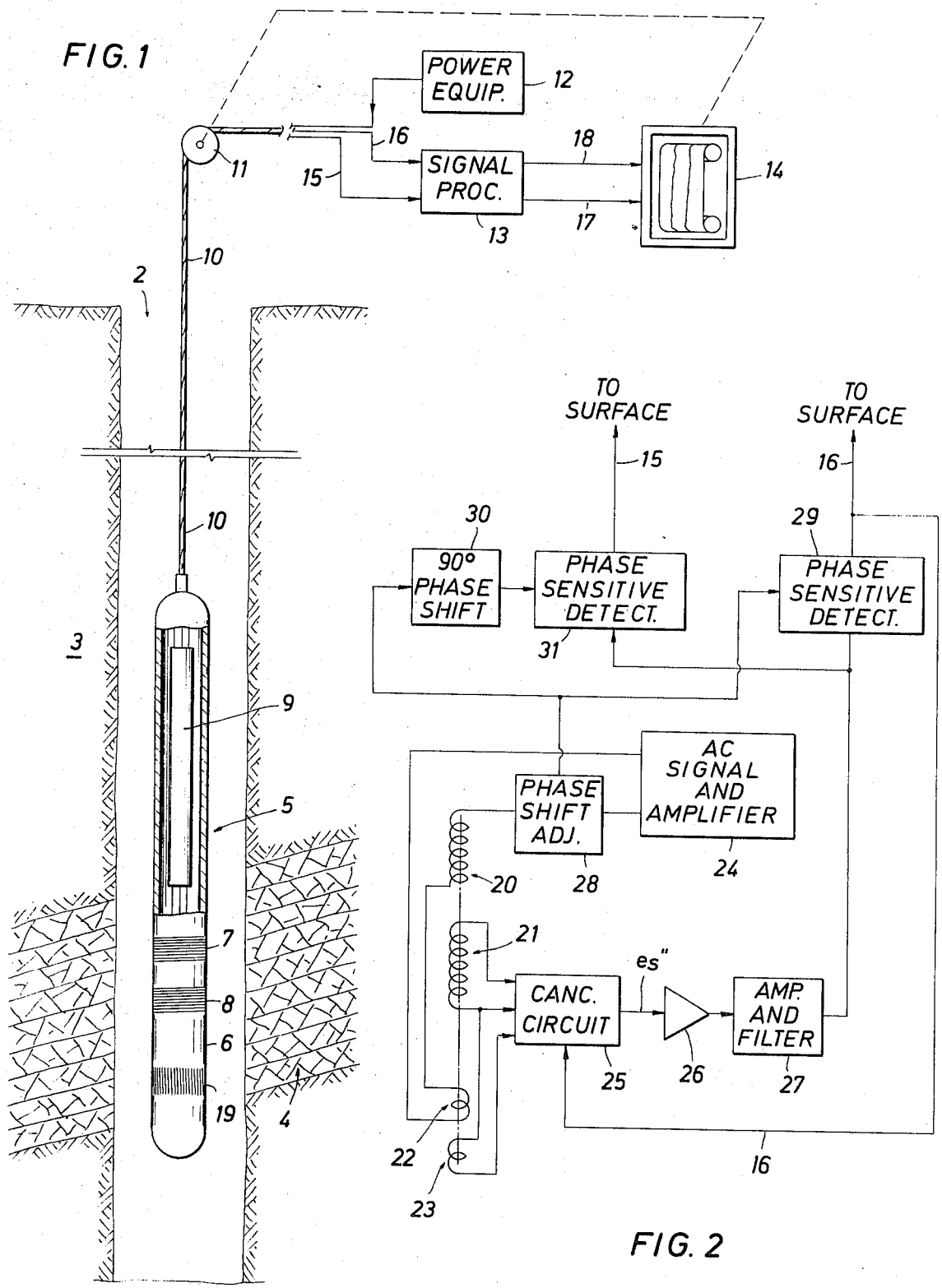

MAGNETIC SUSCEPTIBILITY WELL LOGGING SYSTEM AND METHOD WITH AUTOMATIC NULL CONTROL

BACKGROUND OF INVENTION

This invention relates to methods and apparatus for performing geological investigations, and more particularly relates to improved well logging methods and apparatus for determining selected lithological characteristics of subsurface earth formations.

It is well known that oil and gas is found in certain types of subsurface earth formations, and that boreholes are drilled into the earth for the purpose of tapping these formations and recovering these fluids. It is now also well known that it is frequently difficult to identify a fluid-bearing formation of interest, and that well logging techniques and equipment are employed to survey the various formations traversed by the borehole.

There are many different lithological parameters which are a function of the fluid-bearing properties of a subsurface earth formation, and which may be measured to provide a reasonable indication of the likelihood that oil and gas may be present. For example, it is well known to employ well logging techniques to measure the resistivity of the earth substances traversed by a borehole.

Another well logging operation which is now widely used by the petroleum industry, involves the technique of inducing a current flow in the earth materials adjacent the borehole, and then measuring this current flow to determine the conductivity of the earth. More particularly, an exciter or transmitter coil is disposed in the borehole adjacent a formation of interest, and is then excited with an AC signal of suitable frequency to create an electromagnetic field in the formation. A second search or receiver coil is also disposed in the borehole and an AC signal is induced in the receiver coil by the electromagnetic field which has been induced in the formation. The AC signal being applied to the transmitter coil is of a fixed preselected magnitude, and thus the signal which is induced in the receiver coil will depend on the lithological characteristics of the adjacent formation.

It is well known that the magnitude of the voltage induced in the receiver coil is dependent on the magnitude of current flow being induced in the formation. Accordingly, it is conventional to measure the voltage across the receiver coil which is in phase with the transmitter coil current to obtain an indication of either the conductivity or the resistivity of an earth formation.

It is also well known that the component of the receiver coil voltage which is in phase with the transmitter coil voltage is, at selected frequencies largely a function of the magnetic susceptibility of the formation. Different types of earth formations may have substantially the same conductivity and permittivity, but different magnetic permeability, and thus it has long been sought to provide methods and apparatus for making both a magnetic susceptibility measurement as well as a conductivity measurement of the earth substances traversed by a borehole.

There are various problems involved with magnetic susceptibility logging which are not encountered when a conventional conductivity measurement is sought to be made. A particularly important problem, however, arises from the fact that the voltage variations which are attributable to the magnetic susceptibility of the formation materials, are often quite small in comparison to the component of the receiver coil voltage which is a direct contribution of the transmitter coil voltage through their mutual inductance. For example, it is often found that if the standard component of the receiver coil voltage is on the order of 30,000 microvolts, the fluctuations of the receiver coil voltage which are attributable to magnetic susceptibility of the formation may be as little as 1–2 microvolts. Accordingly, the voltage induced in the receiver coil (or coils) will tend to fluctuate only very slightly, relative to the total induced voltage, even though these fluctuations, and their magnitude, may be highly significant to a determination of the magnetic susceptibility of a formation of interest.

In the most successful technique, an opposing voltage is developed which is identical but opposite in phase to the exciter voltage component of the voltage induced in the receiver coil. More particularly, a transmitter null coil is coupled to the transmitter coil circuit whereby the voltage developed in the transmitter null coil will correspond to the exciter voltage in the transmitter coil. A second or receiver null coil is then inductively coupled to the transmitter null coil, and is then coupled to circuitry for producing the null voltage sought to be obtained. Accordingly, when the null voltage produced by this circuitry is combined with the voltage induced in the receiver coil, the resultant voltage will include substantially only those components which are produced by the electromagnetic field induced in the surrounding earth formation, the mutual inductance component being eliminated.

It is conventional to provide means for varying the amplitude of the null voltage, so as to achieve precise cancellation of only the component of the receiver coil which is attributable to mutual induction by the exciter voltage in the transmitter coil. Accordingly, it is conventional to locate the means for providing this adjustment near other circuitry in the sonde, whereby it is unnecessary to provide long connecting leads which may pick up erratic and unwanted noise signals which will tend to confuse the measurement.

It is also conventional to use a coaxial or triaxial logging cable when logging a deep borehole on the order of 20,000 feet or so. In addition to providing means for suspending the sonde in the borehole, the function of such a cable is to provide a path by which power can be transmitted to the sonde, and a path or paths by which one or more data signals can be transmitted to the surface. It will be apparent that adjustments such as "nulling out" unwanted voltages must be controlled by commands transmitted through the cable without interferring with the power and data signals in the cable.

One control technique of the prior art has included the use of pulse-coded and motor-driven potentiometers at the surface, for developing a coded control signal which could be superimposed on the signals being carried in one of the conductors. In another instance, the control signal is provided by surface equipment having a multiple tone-controlled and motor-driven potentiometer. Control techniques of this type tend to complicate the portion of the circuitry which is in the sonde, however, and substantially increase the amount of power required to be sent down-hole.

In some of the prior art systems, means is provided for manually adjusting the null circuit in the sonde before each logging operation. This is also undesirable, however, because opening the sonde tends to jeopardize the integrity of its water-tight seals. In addition, if any further null adjustments become necessary after the sonde has been run into the borehole, the sonde must first be removed from the borehole and reopened, and this results in the loss of expensive rig time.

These disadvantages of the prior art are overcome with the present invention, and novel methods and apparatus are herewith provided for automatically monitoring and adjusting the null function in the sonde during the logging operation.

SUMMARY OF INVENTION

In a preferred embodiment of the present invention, a magnetic susceptibility logging system is equipped with an automatic null control circuit or apparatus, whereby fluctuations in the amplitude of the null voltage are continually corrected during the logging operation, and whereby the amplitude of the null voltage is continually monitored and maintained at a level corresponding to the amplitude of the component of the receiving coil voltage which is attributable to mutual induction by the exciter voltage in the transmitter coil. In a magnetic susceptibility logging system, a difference amplifier is included for the purpose of combining the null voltage with the voltage from the receiver coil, in order to produce an AC voltage which is a better representation of the conductivity and magnetic susceptibility of the formations of interest. Accordingly, this AC voltage is applied to a phase sensitive detector having its other input coupled to the exciter voltage. The phase sensitive detector produces a recordable DC voltage which is a function of the magnetic susceptibility of the formation.

It will be noted, however, that if the null varies in amplitude from the level corresponding to the mutual induction or exciter-caused component sought to be cancelled, the output voltage from the phase sensitive detector will also provide a functional indication of such variation. Accordingly, the null voltage is preferably applied to one input of a multiplier circuit having its other input coupled to receive a function of the output voltage from the phase sensitive detector, whereby the output produced by the multiplier will correspond to the null voltage at its proper amplitude. In other words, if the input null voltage has the correct amplitude, no change in amplitude will be effected since the multiplying factor in the multiplier will be unity or reference. If the amplitude of the input null voltage is incorrect, however, the magnitude of the error will be determined by the difference amplifier, and the multiplier factor in the multiplier circuit will be either raised or lowered (relative to unity) as may be appropriate.

It will also be noted that although the output voltage from the difference amplifier is primarily an amplitude-dependent function, it is also phase-dependent in the sense that there will be an inherent amplitude difference from two out-of-phase signals. Accordingly, it is an adjunct of the aforementioned automatic null control circuitry to monitor and continually correct for phase differences between the null and receiver voltages before monitoring and correcting for any amplitude variations in the null voltage. Although the present invention contemplates the use of conventional phase regulating and monitoring techniques and circuits, a particularly suitable phase regulating circuit and method may be found in the copending U.S. Pat. application, Ser. No. 211,403, which was filed Dec. 23, 1971 by Donald J. Dowling and assigned to the assignee of the present application.

Accordingly, it is a feature of the present invention to provide a more accurate and reliable measurement of the magnetic susceptibility of a subsurface earth formation.

It is another feature of the present invention to provide magnetic susceptibility well logging methods and apparatus having improved provision for cancelling the voltage component in the receiver coil output signal which is attributable to the mutual induction between the receiver coil and the exciter voltage actuating the transmitter coil.

It is a further feature of the present invention to provide methods and apparatus for deriving a null voltage for cancelling the exciter voltage component of the receiver voltage and for monitoring and correcting amplitude errors occurring in the null voltage during the measurement of the magnetic susceptibility of subsurface earth formations traversed by a borehole.

These and other features and advantages of the invention will become more apparent from the following detailed description, wherein reference is made to the figures of the accompanying drawings.

IN THE DRAWINGS

FIG. 1 is a simplified pictorial representation of a well logging system adapted to survey the magnetic susceptibility and the conductivity of subsurface earth materials according to the concept of the present invention.

FIG. 2 is a simplified functional representation of portions of the system depicted in more general terms in FIG. 1.

DETAILED DESCRIPTION

Figure 3:
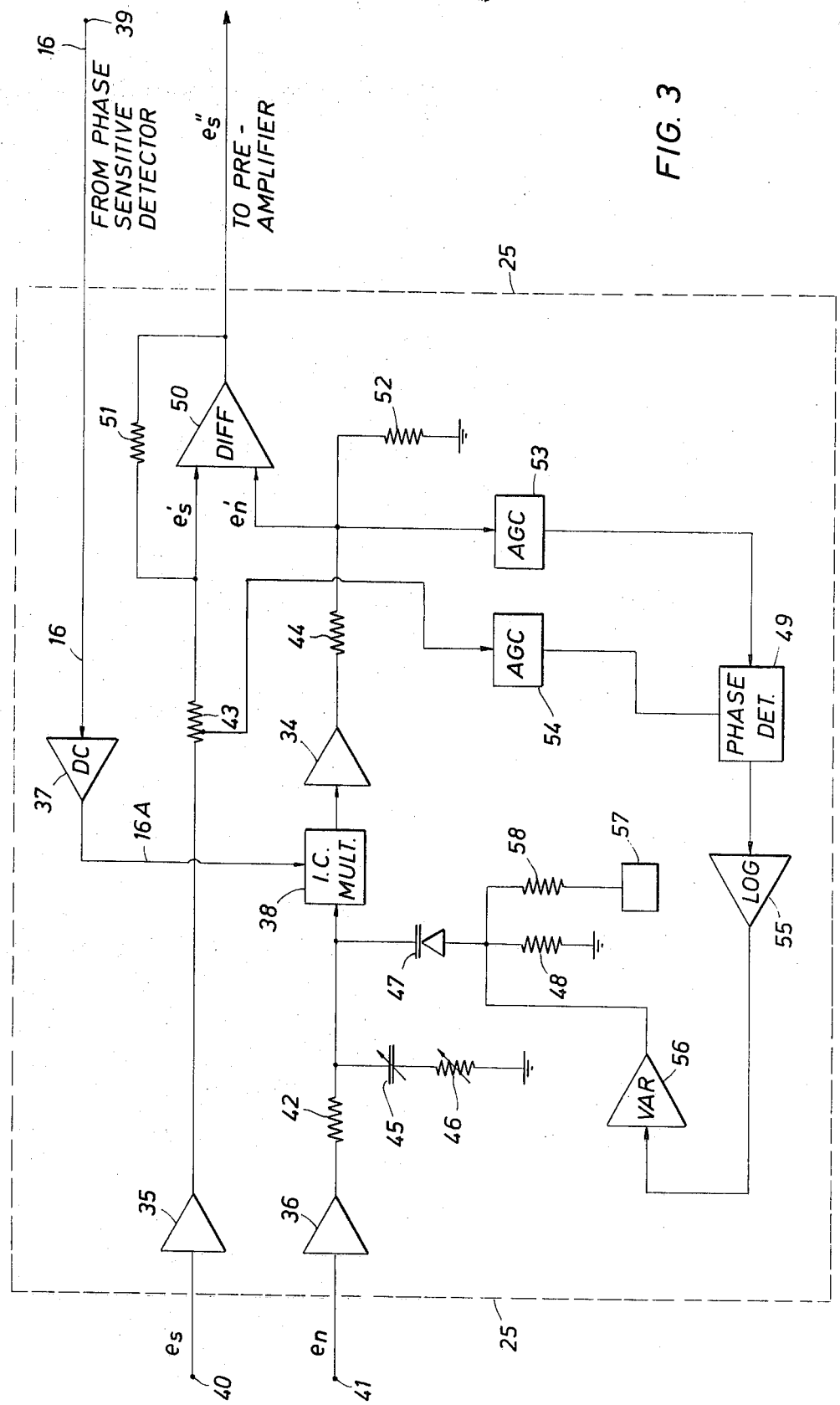
FIG. 3 is a simplified schematic representation of the significant components of an exemplary embodiment of a portion of the apparatus depicted functionally in FIG. 2.

Referring now to FIG. 1, there may be seen a simplified pictorial representation of a well logging system embodying one form of the present invention and adapted to provide a correlative simultaneous measurement of the conductivity and the magnetic susceptibility of the earth materials 3 traversed by a borehole 2. More particularly, the system may be seen to include an elongated logging instrument or sonde 5 which is suspended in the borehole 2, adjacent a formation 4 of interest, by means of a well logging cable 10 of conventional design. The cable 10 may be supported by a sheave wheel 11, and may be connected at the surface to equipment for processing and recording signals produced by the sonde 5.

Referring more particularly to the system, it may be seen that the sonde 5 is composed of a housing 6 which contains a circuitry comprising one or more transmitting coils 7 for generating a localized time-varying electromagnetic field in the vicinity of the borehole 2, and one or more receiver coils 8 for detecting and measuring characteristics of the field as affected by the formation 4. More particularly, the electromagnetic field tends to induce an electromagnetic field in the portions of the formation 4 adjacent the coils 7 and 8 and this, in turn, induces a functionally related voltage signal in the receiver coil 8 which is representative of the formation parameters sought to be measured. In addition, an assembly of null coils 19 is also preferably mounted in some suitable location within the housing 6, so as to be rendered independent of the effect of either the formation 4 or the electromagnetic field which is produced by the transmitter coil 7. Such coils, for example, could comprise a pair of coils wound on a common torroidal core material.

Referring again to the sonde 5, it may be seen that suitable electronics 9 may also be located in the housing 6, for actuating the transmitter and null coils 7 and 19, and for correcting and handling the measurement signals provided by the receiver coils 8. Thus, the electronics 9 may include means as hereinafter described for correcting these measurement signals for phase shift occurring as a result of factors such as temperature effects on portions of the electronics 9, impedance factors inherent in the construction of the coils 7, 8 and 19, and the conductivity of the formation 4 being investigated. If desired, these corrections may alternatively be made by circuitry located at the surface, of course.

In an ideal embodiment of the present invention, the electronics 9 will include means for deriving a signal which is functionally representative of the conductivity of the formation 4 being investigated, and a correlative but separate signal which is functionally representative of the magnetic susceptibility of the formation 4.

Referring again to FIG. 1, it may be seen that the surface equipment may include a master power supply 12 for energizing the system, suitable processing circuitry 13 for amplifying and processing the conductivity signal 15 and the magnetic susceptibility signal 16 received from the cable 10, and a suitable recorder 14 for correlatively displaying the processed conductivity and magnetic susceptibility signals 17 and 18 received from the processing circuitry 13, as well as any other measurement signals which may be obtained from the sonde 5. The surface power supply 12 can transmit power to the electronics 9 in the sonde 5 in a conventional manner.

The sheave wheel 11 is intended to support the logging cable 10 and sonde 5 in the borehole 2 as hereinbefore mentioned, and thus the sheave wheel 11 may be suspended over the mouth of the borehole 2 by any suitable means such as a derrick (not depicted) or other such means. The sheave wheel 11 may also perform the additional function of measuring the length of the cable 10 being paid into the borehole 2, and thus the recorder 14 is preferably mechanically or electrically interconnected to be driven by the rotating sheave wheel 11 to provide a correlative indication of the depth of the sonde 5 in the borehole 2.

Referring now to FIG. 2, there may be seen a simplified schematic representation of portions of the apparatus depicted in FIG. 1. In particular, the apparatus may include a suitable AC signal source and amplifier assembly 24 of conventional design for providing an appropriate exciter voltage to a transmitter coil 20 and an oppositely wound transmitter null coil 22. The exciter voltage signal from the AC signal source 24 may also be seen to be applied through a suitable phase shift adjustment circuit 28 to a phase sensitive detector 29, and through a 90° phase shift circuit 30 to one of the inputs of a second phase sensitive detector 31.

It is the purpose of the transmitter coil 20 to generate the localized electromagnetic field which, as hereinbefore explained, induces a corresponding electromagnetic field in the formation 4 depicted in FIG. 1. Accordingly, a receiver coil 21 is also preferably included for developing a voltage signal which is a function of the electromagnetic field induced in the adjacent formation 4, and which is functionally related to the magnetic susceptibility of the formation 4.

The greater portion of the voltage induced in the receiver coil 21 is usually a contribution of the exciter voltage actuating the transmitter coil 20 which is transmitted by mutual inductance, and only a very small portion is usually attributable to the magnetic susceptibility of the formation 4 in question. Thus, the various fluctuations in the receiver voltage will usually be quite small in proportion to the overall voltage induced in the receiver coil 21, even though these fluctuations may be highly significant in any determination of magnetic susceptibility.

It will be apparent that it would be desirable for magnetic susceptibility measurements if the induced voltage in the receiver coil 21 could be attributed substantially entirely to the magnetic susceptibility of the formation 4. Accordingly, in the system depicted in FIGS. 1 and 2, this is accomplished by the provision of a receiver null coil 23, which is positioned to pick up the signal being applied to the transmitter null coil 22 by the AC signal source 24, and which is interconnected with the receiver coil 21. The two null coils 22 and 23 are both arranged to be unaffected by the formation 4 adjacent the sonde 5, as hereinbefre stated, and thus the voltage induced in the receiver null coil 23 by the signal applied to the transmitter null coil 22 will correspond with the unwanted contribution to the receiver voltage which is attributable to the signal from the AC signal souce 24. It will be noted, however, that the voltage signal induced in the receiver null coil 23 by the transmitter null coil 22 will be 180° out of phase with the voltage signal in the receiver coil 21. Thus, the signal in the receiver null coil 23 may be used to cancel the component of the voltage in the receiver coil 21 which is attributable to the signal from the AC signal source 24. Thus the voltage remaining in the receiver coil 21 signal may be attributable to the magnetic susceptibility of the formation 4 of interest. Accordingly, there is preferably included a suitable null or cancelling circuit 25 for combining the voltages induced in the coils 21 and 23 so as to cancel or null out the voltage component in the receiver coil 21 which is attributable to the exciter voltage in the transmitter coil 20. As will hereinafter be explained in detail, the cancelling circuit 25 preferably includes provision for automatically regulating the amplitude of the null voltage as a function of the magnetic susceptibility signal 16, as well as further provision for monitoring and regulating the phase relationship between the voltages in the coils 21 and 23.

Referring again to FIG. 2, it will be noted that the adjusted magnetic susceptibility signal from the cancelling or null circuit 25 is preferably applied to a suitable preamplifier 26, and is thereafter further processed in a conventional manner by an amplifier and filter circuit 27 before being applied to the two phase sensitive detectors 29 and 31.

As hereinbefore explained, the electronics 9 and the various coil assemblies 7, 8 and 19 depicted in FIG. 1 will have their own impedance characteristics, and this will tend to introduce changes in the amplitude as well as the phase angle of both the magnetic susceptibility signal and the exciter voltage supplied by the AC signal source 24. The cancelling circuit 25 can be made to monitor and correct for these as well as the other amplitude and phase shifts hereinbefore referred to, as will hereinafter be explained in detail. Phase shifts resulting from the relatively fixed impedances of the system are usually relatively large in magnitude, and since they are also relatively fixed in magnitude, it is preferable to provide means for conveniently calibrating the system to eliminate this source of error. Accordingly, a manually operated phase adjustment circuit 28 is preferably included for the purpose of calibrating the system and eliminating errors arising from this source.

If the system has been properly calibrated, however, it will be apparent that the corrected magnetic susceptibility voltage signal will be exactly in phase with the exciter voltage, and thus the output of the first phase sensitive detector 29 will provide the magnetic susceptibility signal on the conductor 16 which is transported to the surface by way of the cable 10.

Referring again to the voltage induced in the receiver coil 21, it should be noted that the net voltage which is derived from the cancelling circuit 25 after cancellation of the voltage component corresponding to the exciter voltage in the transmitter coil 20, will nevertheless still be composed of the various components which are a function of the coupling effect provided by the formation 4. One voltage component is attributable to the magnetic permeability of the coupling formation 4, and is the primary basis for the magnetic susceptibility measurement represented by the output voltage 16 from the first phase sensitive detector 29. By appropriate choice of operating frequency (for example about 1KH$_z$) the magnetic susceptibility component may be made the primary formation contribution. The other component of the formation signal is a result of the conductivity of the formation 4. This component may be enhanced relative to the susceptibility component by operating signal source 24 at a higher frequency.

For reasons which are apparent to those skilled in this art, the voltage component of the output signal from the phase monitoring and correction circuit 25 corresponding to the magnetic susceptibility of the formation 4 is always 90° out of phase or in phase quadrature with the voltage component corresponding to the conductivity of the formation 4. Thus, when the sample of the exciter voltage is input to the first phase sensitive detector 29 a DC output signal is provided on conductor 16 which is proportional to the magnetic susceptibility component of the input voltage signal from the amplifier and filter circuit 27.

On the other hand, when the phase of the exciter voltage is shifted 90° as, for example by the 90° phase shifter circuit 30, it will then be in phase with the conductivity component of the signal from the amplifier and filter circuit 27. Thus, the DC output voltage on conductor 15 from the second phase sensitive detector 31 will constitute a voltage signal which comprises the functional representation of the conductivity of the formation 4. Furthermore, since both voltage signals on conductors 15 and 16 are derived during the same trip through the borehole 2, this will provide simultaneous and correlative measurements of both the conductivity and magnetic susceptibility of the formation 4. Of course, it will be appreciated that for both measurements to be made simultaneously, a compromise choice of operating frequency of signal source 24 should preferably be made.

Referring now to FIG. 3, there may be seen a schematic representation in more detail of one form of the null or cancelling circuit 25 exemplifying the concepts of the present invention. In particular, it will be noted that the receiver voltage $e_s$ induced in the receiver coil 21 is coupled to input terminal 40, and the null voltage induced in the receiving null coil 23 is coupled to input terminal 41. Accordingly, the reciever voltage $e_s$ is applied through a first conditioning amplifier 35 and resistor 43 to apply to one of the two inputs of a difference amplifier 40 in the form of voltage $e'_s$. The null voltage $e_n$ from coil 23 which is applied through a second conditioning amplifier 36 and resistor 42, is preferably applied instead to one of the inputs of a suitable integrated circuit multiplier 38 having its output connected via resistor 44 and amplifier 34 to the opposite input of difference amplifier 50 and is labelled $e'_n$ in FIG. 3.

As noted in FIG. 2, the output voltage on conductor 16 is produced by the first phase sensitive detector 29. This signal, which is representative of the magnetic susceptibility of the formation 4, is applied to the cancelling circuit 25 via DC amplifier 37 for regulating the amplitude of the null voltage $e'_n$. Referring again to FIG. 3, therefore, it will be seen that a third input terminal 39 is connected to couple the voltage on conductor 16 to the input of the DC amplifier 37 and from there to one input terminal of the multiplier 38. Multiplier 38 produces an output voltage having an amplitude which is a function of the product of the amplitudes of the output voltage 16A from the DC amplifier 37 and the null voltage $e_n$ from terminal 41. As will be subsequently explained, the $e_n$ voltage input to multiplier 38 will have been conditioned prior to this input.

It will be apparent to those having experience in this art that the voltage on conductor 16 generated by the phase sensitive detector 29 is relatively small in magnitude, in comparison with the magnitude of the null voltage $e_n$. It is the function of the DC amplifier 37, therefore, to raise the level of the voltage on conductor 16 to that required to properly operate the multiplier 38, whereby the sensitivity and stability of the system is properly adjusted.

It will be apparent that any of several different multiplying circuits may be employed for the purposes of the multiplier 38, although an especially suitable apparatus is a Type MC 1595L Integrated Circuit Multiplier which is manufactured and sold by Motorola Corporation, and which has a relatively wide dynamic range. However, such a device also has an inherent reduction factor of 10, and thus its output is actually only one-tenth the product of the amplitudes of the voltage 16A and the conditioned voltage $e_n$. For this reason, it is preferable to apply the output of the multiplier 38 to an amplitude restoring amplifier 34, to build back the level of the signal to what it would be had the multiplier 38 had no reduction factor. Accordingly, it is the output of the amplifier 34 and resistor 44 which constitutes the stabilized null voltage $e'_n$, and which is preferably applied to the other input of the difference amplifier 50.

The function of the difference amplifier 50 is to combine the receiver and null voltages $e'_s$ and $e'_n$, so as to cancel the voltage component in the receiver voltage $e_s$ which is attributable to the exciter voltage. Accordingly, it is the output $e''_s$ from the difference amplifier 50 which is applied to the preamplifier 26 depicted in FIG. 2.

As hereinbefore stated, the null voltage $e_n$ is also subject to phase shifts which occur because of temperature changes and other abnormal conditions which are often encountered in the borehole. The output signal $e''_s$ from the difference amplifier 50 is dependent on the relative phase of its two input voltages $e'_s$ and $e'_n$, since there will be an inherent amplitude difference between two otherwise identical AC signals of equal peak amplitude. Accordingly, it is an important feature of the accuracy of the $e''_s$ signal supplied to the preamplifier 26, that both voltages $e'_s$ and $e'_n$ be coincident in phase.

Referring again to FIG. 3, it will be seen that the depicted circuitry includes provision for monitoring and correcting for any phase angle occurring between the two inputs $e'_s$ and $e'_n$ to the difference amplifier 50. In particular, it will be noted that the voltages $e'_s$ and $e'_n$ are supplied to the inputs of a phase detector circuit 49 to measure any phase difference which may occur between the two signals $e'_s$ and $e'_n$. Although the phase detector 49 produces a phase-dependent output, it should be noted that the output of the phase detector 49 is also a function of any differences in amplitude between its inputs. Accordingly, the two voltages $e'_s$ and $e'_n$ are preferably stabilized in amplitude by automatic gain control circuits 53 and 54 of appropriate design, before being applied to the phase detector 49.

The output voltage from the phase detector 49, which is linearly proportional to any phase difference between the input voltages $e'_s$ and $e'_n$, is preferably supplied through a logarithmic gain amplifier 55 to a variable gain DC amplifier 56, which applies a DC voltage to one side of a voltage sensitive semiconductor diode or varactor 47 coupled between a grounded load resistor 48 and the $e_n$ input of the multiplier 38. It is well known to achieve phase shift in an AC circuit by interconnecting a capacitance either in series or parallel into the circuit. The function of the voltage sensitive diode 47 is to produce a phase shift in the null voltage $e_n$ before it is applied to the multiplier, to an extent which is dependent on the capacitance characteristic of the diode 47. However, the function of the DC voltage from the variable gain amplifier 56 is to regulate the phase shift produced in the null voltage $e_n$, by regulating the capacitance of the diode 47 in accordance with the magnitude of the voltage output of the phase detector 49.

The function of the logarithmic amplifier 55 is to reform or reorganize the gain characteristics of the output voltage from the phase detector 49 so as to more closely match the capacitance vs. voltage characteristics of the voltage sensitive diode 47. More particularly, it is well known that usually this capacitance factor of a typical voltage sensitive diode element 47 is non-linear in character. Accordingly, the logarithmic amplifier 55 converts the linear output voltage of the phase detector 49 into a non-linear output voltage more closely matching the capacitance vs. voltage characteristics of the diode 47.

The phase detector 49 and logarithmic amplifier 55 both provide AC output voltages, whereas the diode 47 responds to a DC voltage. Accordingly, the variable gain amplifier 56 is included in the depicted circuitry for the purpose of transforming the logarithmic AC output voltage from the logarithmic amplifier 55 into a DC voltage with similar logarithmic characteristics.

Another feature of the diode 47 is the fact that its capacitance characteristic tends to vary inversely with the magnitude of the DC voltage from the variable gain amplifier 56. In other words, if a substantially large phase shift occurs between the input voltages $3'_s$ and $e'_n$, this will be evidenced by a correspondingly large output voltage from the phase detector 49 and the two amplifiers 55 and 56. If a large DC voltage is applied to the diode 47, however, this will drive the capacitance characteristic of the diode 47 to a minimum, and will produce only a correspondingly very small phase shift in the input null voltage $e'_n$.

In the circuitry depicted in FIG. 3, this disadvantage is met by the application of a fixed negative DC bias voltage of a preselected magnitude in parallel with the other positive DC adjustment voltage from the amplifier 56. Thus, an increase in the positive DC voltage from the amplifier will tend to decrease the total negative DC voltage being applied to the diode 47. More particularly, this fixed negative DC bias voltage is supplied by a resistor 58 and DC voltage supply 57 which is coupled to the diode 47 in parallel with the output signal from variable DC amplifier 56.

Not all phase shifts which occur in the null voltage $e'_n$ will result from unstable environmental factors in the borehole 2, of course, since many capacitances will be produced in various places in the electronic circuitry package 9 during operation of the system. These system capacitances are usually fixed in magnitude, however, and may be calibrated out of the null circuitry in a conventional manner. Accordingly, a variable capacitance 45 and variable resistor 46 may be connected in parallel with the output of the second conditioning amplifier 36 for this purpose.

Referring again to the phase sensitive detector 29, it will be noted that although the function of this component of the system is to produce an output voltage on conductor 16 which is a function of the amplitude difference between two inphase input frequencies, it will only produce such a voltage if both inputs are present. If the sonde 5 is suspended in the air above the earth 3 (as is common practice when the system is sought to be calibrated) and if the null voltage $e'_n$ is equal in amplitude and phase alignment with the exciter voltage component of the receiver voltage $e'_s$, then the two input voltages $e'_n$ and $e'_s$ to the difference amplifier 50 will be equal in amplitude and phase and the difference amplifier 50 will produce a zero output signal. Hence, the phase sensitive detector 29 will also produce a zero output voltage, since it will not respond to the exciter voltage input alone.

The function of the multiplier 38 is to apply a multiplying factor to the input null voltage $e_n$ which is a function of any difference between the phase-adjusted null voltage $e'_n$ and the exciter voltage component of the receiver voltage $e'_s$. If the voltages $e'_s$ and $e'_n$ are equal, and if the phase sensitive detector 29 accordingly generates a zero output, the multiplying factor will be the functional equivalent of unity, of course, since no input signal 16A will be received by the multiplier 38. If the null voltage $e_n$ does not equal the exciter voltage component of the receiver voltage $e'_s$, however, the difference amplifier 50 will detect this fact, and its output $e''_s$ will cause the phase sensitive detector 29 and DC amplifier 37 to provide an appropriate signal 16A to alter the multiplying factor accordingly. If the null voltage $e_n$ is less than the component sought to be canceled, then the multiplying factor will be increased to greater than unity to increase the value of $e'_n$ by an appropriate amount. If the null voltage $e_n$ is greater than the component sought to be canceled, however, then the multiplying factor will be driven below unity to appropriately reduce the value of $e'_n$.

It will be apparent that the output of the multiplier 38 is principally an amplitude-dependent function, and that the multiplier 38 and its associated circuitry will operate irrespective of the phase relationship between the input voltages $e'_n$ and $e'_s$. It will also be apparent, however, that the output of the multiplier 38 is also a phase-dependent function because of the phase-dependent character of the difference amplifier 50. Accordingly, the phase monitoring and correcting circuitry composed of the phase detector 49 and diode 47 constitute an important adjunct to the amplitude monitoring and correction circuitry comprising the multiplier 38 and difference amplifier 50.

Various other modifications and alternatives will be apparent which will be within the scope of the present invention. Accordingly, it should be clearly understood that the methods and structures hereinbefore describd and illustrated in the accompanying drawings are exemplary only and are not intended as limitations on the scope of the invention.

What is claimed is:

1. In a logging system for determining the magnetic susceptibility of a subsurface earth formation traversed by a borehole, the combination comprising an AC power supply for providing an exciter voltage, a transmitting inductance for generating an electromagnetic field in said borehole and formation in response to said exciter voltage, a receiving inductance for deriving from said field a receiver voltage having components attributable to said exciter voltage and to the magnetic susceptibility of said formation, a null inductance for deriving a null voltage opposite in phase and functionally related in amplitude to said exciter voltage component of said receiver voltage, correction means for detecting a difference in amplitude between said null voltage and said exciter voltage component and for adjusting the amplitude of said null voltage to coincide with the amplitude of said exciter voltage component, and canceling means responsive to said receiver voltage and said adjusted null voltage for canceling said exciter voltage component of said receiver voltage.

2. The system described in claim 1, wherein said correction and canceling means include difference means interconnected with said receiving and null inductances for deriving a difference voltage functionally related to any difference in amplitude between said null voltage and said receiver voltage, and adjustment means interconnected between said null inductance and said difference means for varying the amplitude of said null voltage as a function of said difference voltage.

3. The system described in claim 2, wherein said adjustment means further includes phase sensitive means responsive to said difference voltage and said exciter voltage for deriving a recordable signal functionally related to the magnetic susceptibility of said formation, and multiplying means responsive to said recordable signal for multiplying said null voltage by a factor which is a function of said detected amplitude difference between said null voltage and said exciter voltage component of said receiver voltage.

4. The system described in claim 3, wherein said adjustment means further includes phase correction means interconnected between said null inductance means and said multiplying means for detecting the occurrence of any phase difference between said null and receiver voltages and for realigning said null voltage into phase with said receiver voltage.

5. The system described in claim 4, wherein said phase correction means includes phase monitoring means interconnected between said difference means and said multiplying means for detecting the occurrence and magnitude of any phase difference between said receiver voltage and said multiplied null voltage, and phase alignment means interconnected between said null inductance means and said multiplying means for adjusting the phase of said null voltage in response to said phase monitoring means.

6. In a logging system for determining the magnetic susceptibility of a subsurface earth formation traversed by a borehole, the combination comprising an AC power supply for providing an exciter voltage, a transmitting inductance for generating an electromagnetic field in said borehole and formation in response to said exciter voltage, a receiving inductance for deriving from said field a receiver voltage having components attributable to said exciter voltage and to the magnetic susceptibility of said formation, a null inductance for deriving a null voltage opposite in phase and at least substantially equal in magnitude to said exciter voltage component of said receiver voltage, comparison means for deriving a difference voltage functionally related in magnitude to the difference amplitude between said null and receiver voltages, and null regulating means responsive to said difference voltage for maintaining a predetermined amplitude relationship between said null voltage and said exciter voltage component of said receiver voltage.

7. The system described in claim 6, wherein said null regulating means further includes phase regulating means for maintaining a predetermined phase relationship between said null and receiver voltages, and amplitude regulating means for maintaining a predetermined amplitude relationship between said phase-regulated null voltage and said exciter voltage component of said receiver voltage.

8. The system described in claim 7, wherein said amplitude regulating means further includes a phase sensitive detector for deriving a DC voltage functionally related to the amplitude difference between said exciter voltage from said AC power supply and said difference voltage from said comparison means, and multiplying means for multiplying the amplitude of said phase-regulated null voltage by a function of said DC voltage from said phase sensitive detector.

9. The system described in claim 7, wherein said multiplying means further includes
a DC amplifier interconnected with said phase sensitive detector for generating a function voltage having an amplitude functionally related to said DC voltage from said phase sensitive detector,
a multiplier having one input coupled to receive said function voltage from said DC amplifier and another input coupled to receive said phase-regulated null voltage for providing an output voltage functionally related in amplitude to the product of the amplitudes of said function voltage and said phase-regulated null voltage, and
a gain restoring amplifier interconnected between said multiplier and said comparison means for generating and applying to said comparison means an amplitude-regulated null voltage corresponding to the exciter voltage component of said receiver voltage.

10. The system described in claim 9, wherein said phase regulating means includes
a phase detector for deriving an AC phase measurement voltage functionally related in amplitude to any phase difference between said amplitude-regulated voltage and said exciter voltage,
a semiconductance interconnected to establish a phase-shifting capacitance between said null inductance and said multiplier, and
a DC voltage means responsive to said phase detector for generating a control voltage to regulate the magnitude of said gain-shifting capacitance in functional relationship to the magnitude of said phase-measurement voltage.

11. A method for determining the magnetic susceptibility of a subsurface earth formation traversed by a borehole, comprising
generating an AC exciter voltage,
generating an electromagnetic field in said borehole and formation in response to said exciter voltage,
deriving from said field a receiver voltage having components attributable to said exciter voltage and to the magnetic susceptibility of said formation,
deriving a null voltage opposite in phase and functionally related in amplitude to said exciter voltage component of said receiver voltage,
detecting a difference in amplitude between said null voltage and said exciter voltage component and adjusting the amplitude of said null voltage to coincide with the amplitude of said exciter voltage component, and
canceling said exciter voltage component of said receiver voltage as a function of the difference between said receiver voltage and said adjusted null voltage.

12. The method described in claim 11, wherein said correction and canceling steps include
deriving a differnce voltage functionally related to any difference in amplitude between said null voltage and said receiver voltage, and
adjusting the amplitude of said null voltage as a function of said difference voltage.

13. The method described in claim 12, wherein said adjustment step further includes
deriving from said difference voltage and said exciter voltage a recordable signal functionally related to the magnetic susceptibility of said formation, and
multiplying said null voltage by a factor derived from a function of said detected amplitude difference between said null voltage and said exciter voltage component of said receiver voltage.

14. The method described in claim 13, wherein said adjustment step further includes
detecting the occurrence of any phase difference between said null and receiver voltages and realigning said null voltage into phase with said receiver voltage.

15. The method described in claim 14, wherein said phase correction step includes
detecting the occurrence and magnitude of any phase differnce between said receiver voltage and said multiplied null voltage, and
adjusting the phase of said null voltage in response to said phase monitoring means.

16. A method for determining the magnetic susceptibility of a subsurface earth formation traversed by a borehole, comprising
generating an AC exciter voltage,
generating an electromagnetic field in said borehole and formation in response to said exciter voltage,
deriving from said field a receiver voltage having components attributable to said exciter voltage and to the magnetic susceptibility of said formation,
deriving a null voltage opposite in phase and at least substantially equal in magnitude to said exciter voltage component of said receiver voltage,
deriving a difference voltage functionally related in magnitude to the difference amplitude between said null and receiver voltages, and
maintaining a predetermined amplitude relationship between said null voltage and said exciter voltage component of said receiver voltage in response to said difference voltage.

17. The method described in claim 16, wherein said maintaining further includes
maintaining a predetermined phase relationship between said null and receiver voltages, and
maintaining a predetermined amplitude relationship between said phase-regulated null voltage and said exciter voltage component of said receiver voltage.

18. The system described in claim 17, wherein said amplitude maintaining step further includes
deriving a DC voltage functionally related to the amplitude difference between said exciter voltage and said difference voltage, and
multiplying the amplitude of said phase-regulated null voltage by a function of said DC voltage.

19. The method described in claim 18, wherein said multiplying step further includes
generating a function voltage having an amplitude functionally related to said DC voltage,
providing an output voltage functionally related in amplitude to the product of the amplitudes of said function voltage and said phase-regulated null voltage, and
deriving from said function voltage and said output voltage an amplitude-regulated null voltage component of said receiver voltage.

20. The method described in claim 19, wherein said phase maintaining step further includes
deriving an AC phase measurement voltage functionally related in amplitude to any phase difference between said amplitude-regulated voltage and said exciter voltage,
establishing a phase-shifting capacitance between said null inductance and said multiplier, and
generating a control voltage to regulate the magnitude of said phase-shifting capacitance in functional relationship to the magnitude of said phase-measurement voltage.

* * * * *